United States Patent [19]

Mackintosh

[11] 3,995,560
[45] Dec. 7, 1976

[54] RAIL OBSTRUCTION SENSING MEANS FOR A RAIL TRANSPORTATION SYSTEM

[76] Inventor: Charles Mackintosh, 3838 Oakwood Ave., Los Angeles, Calif. 90004

[22] Filed: Aug. 12, 1975

[21] Appl. No.: 603,951

[52] U.S. Cl. .............................. 104/1 R; 104/139; 104/146; 104/161; 246/182 B
[51] Int. Cl.² ....................................... B61B 13/00
[58] Field of Search .............. 104/1 R, 138 R, 139, 104/140, 146, 149, 152, 154, 155, 156, 159, 161; 180/82 R, 105 R, 105 E, 108; 246/182 R, 182 B, 182 C, 187 C

[56] References Cited
UNITED STATES PATENTS

| | | | |
|---|---|---|---|
| 400,302 | 3/1889 | Clark | 104/159 |
| 3,365,572 | 1/1968 | Strauss | 246/187 C X |
| 3,587,470 | 6/1971 | Wilson | 104/149 |
| 3,749,026 | 7/1973 | Carrasse | 104/156 |
| 3,921,830 | 11/1975 | Bright | 246/182 B X |

Primary Examiner—Robert J. Spar
Assistant Examiner—Randolph A. Reese
Attorney, Agent, or Firm—Watson, Cole, Grindle & Watson

[57] ABSTRACT

In a rail transportation system, a sensor assembly is mountable on a rail vehicle for detecting, during the travel thereof, a rail obstruction which would inhibit continued and uninterrupted travel of the vehicle and for transmitting such detection to the vehicle speed control for regulating the same to thereby avoid a perilous situation. The sensor assembly includes a leashed sensor element which is guidingly propelled forwardly of the vehicle parallel to the rail at a distance required for a comfortable stop depending on vehicle speed. Travel of the sensor element is retarded upon contacting the obstruction thereby causing a reel to which the leash is connected to rewind and accordingly regulate the vehicle speed control to bring the travelling vehicle to a complete and safe stop if necessary.

7 Claims, 11 Drawing Figures

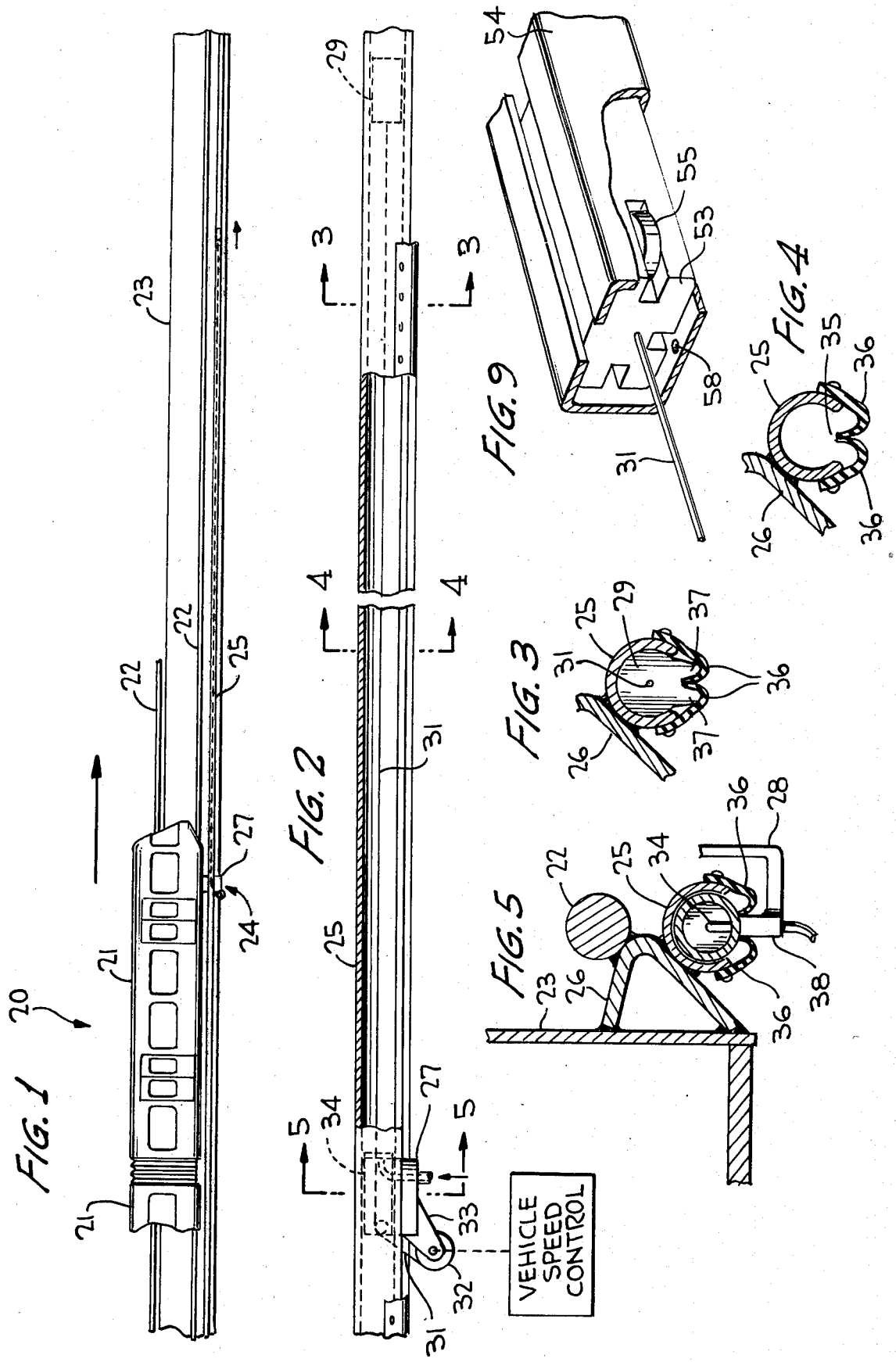

U.S. Patent  Dec. 7, 1976  Sheet 2 of 2  3,995,560
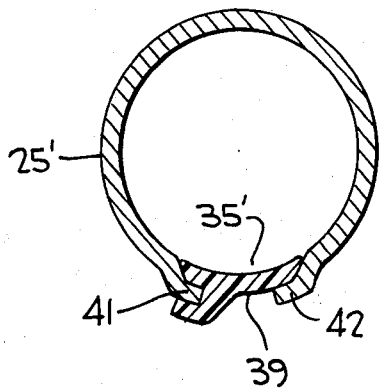
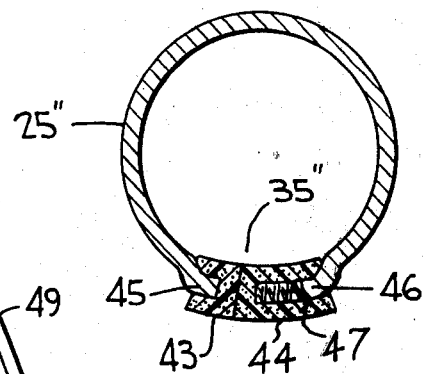
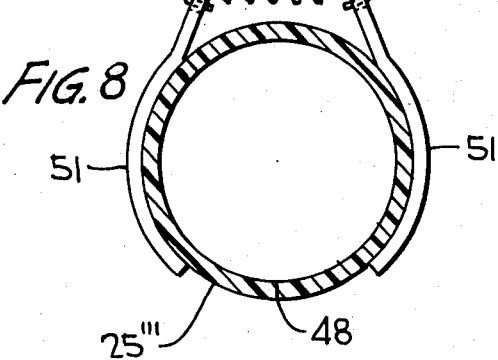
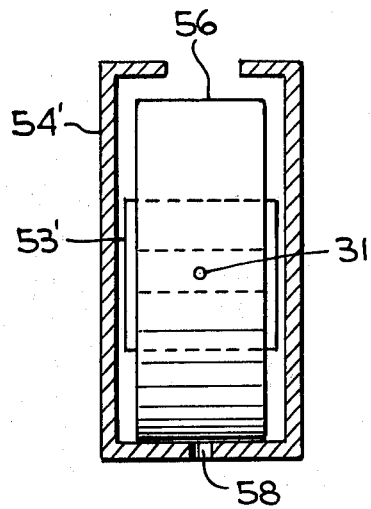
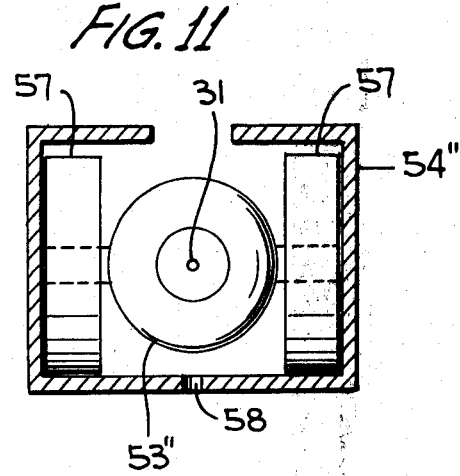

RAIL OBSTRUCTION SENSING MEANS FOR A RAIL TRANSPORTATION SYSTEM

BACKGROUND OF THE INVENTION

This invention relates generally to a transportation system, and more particularly to such a system wherein a sensor assembly is mountable on a rail vehicle for detecting a rail obstruction which would inhibit continued and uninterrupted travel of the vehicle.

In rail transportation systems of the standard variety as well as of the monorail types designed for urban rapid rail travel, it is desirable for the systems to be designed as automatically operable as possible. Hence, a system controlled without the need of an operator on board the rail vehicle would be the ultimate in cost and labor savings except that fully automatic systems to date have not proven feasible and economical because of their complex designs. Control of the vehicle speed should be based on existing rail car traffic so that cars on the same track can be detected automatically and the speed of any particular car automatically regulated. Also, any rail obstructions such as damaged rails or station stop signals must be detected safely in advance so that the car speed can be regulated in time to avoid a perilous condition.

OBJECTS OF THE INVENTION

It is therefore an object of the present invention to provide a means for simply and economically sensing any rail obstruction in a rail transportation system by measuring the distance to that obstruction and causing the speed control of the vehicle to be regulated appropriately for avoiding that obstruction.

Another object of this invention is to provide such a sensing means which comprises a sensor assembly having a contact sensor element on a reeled wire or cable leash and being guided along the vehicle rail and maintained ahead of the vehicle so that, upon the detection of a rail obstruction, the reel which is connected to the car speed control may regulate vehicle speed as it is being reeled up.

A further object of this invention is to provide such a sensor assembly wherein the contact sensor element is guided within a hollow tube and is maintained by either pneumatic or electric means at a predetermined distance ahead of the vehicle depending on vehicle speed.

A still further object is to provide such a sensor assembly for a rail transportation system wherein a closed guide tube is provided for use with the pneumatic system, such tube having an elongated slot therealong which is resiliently closable so as to permit the tube to remain pressurized between the vehicle and the contact elements while permitting an air nozzle to extend therein during vehicle travel.

A still further object of this invention is to provide such a sensor assembly wherein the sensor element is in the form of an electric motor capable of rolling within the tube and being powered from a source through the wire leash.

Other objects, advantages and novel features of the invention will become more apparent from the following detailed description of the invention when taken in conjunction with the accompanying drawings.

BRIEF DESCRIPTION OF THE DRAWINGS

FIG. 1 is a side elevational view of part of a rail transportation system incorporating the sensor assembly according to the invention;

FIG. 2 is a side elevational view partly in section showing the sensor assembly in relation to a hollow guide member mountable on a track of the rail system which supports the vehicle rail;

FIGS. 3, 4 and 5 are cross-sectional views respectively taken substantially along lines 3—3, 4—4 and 5—5 of FIG. 2;

FIGS. 6, 7 and 8 are sectional views of different embodiments of the guide members shown in FIGS. 3 to 5;

FIG. 9 is a perspective view partly in section showing the contact sensor element driven by an electric motor within the guide member; and FIGS. 10 and 11 are respectively sectional views of other embodiments of the electric type driving means for the sensor element.

DESCRIPTION OF THE DISCLOSED EMBODIMENTS

Turning now to the drawings wherein like reference characters refer to like and corresponding parts throughout the several views, a transportation system generally designated 20 in FIG. 1 and embodying the present invention is shown in accordance with my U.S. application, Ser. No. 598,875 filed July 24, 1975 on a TRANSPORTATION SYSTEM. Rail vehicles 21 are supported on a pair of spaced rails 22 mounted on a track 23 for travel therealong. A sensor assembly generally designated 24 is capable of being mounted on the forward car 21 and is likewise capable of being used with other rail transportation systems of the standard variety or of the various monorail-type constructions.

A hollow and elongated guide member 25 may be mounted as by welding to supports 26 which may be in the form of V-irons as disclosed in the aforementioned application. Lower rail 22 is likewise mounted on these supports as by welding, and the guide member is disposed parallel to this bottom rail as shown in the drawings.

Sensor assembly 24 comprises a housing or fitting 27 fixedly mounted to the rail vehicle as by means of a bracket 28 shown in FIG 5. A sensor element 29, generally of a shape complementary to the interior shape of the guide member, is disposed for movement ahead of the forward vehicle within the guide member. As shown in FIG. 3 this sensor element is of such a configuration as to be loosely embraced by the guide member.

The sensor element is leashed to housing 27 by means of an elongated wire or cable 31 attached to a reel 32 which is rotatably mounted to a bracket 33 provided on the housing.

In accordance with the invention the sensor element is designed to travel within guide member 25 ahead of the forward car at a distance required to permit a comfortable stop of the vehicle from full speed upon the detection of a rail obstruction. For example, with the vehicle travelling 40 mph this distance of travel of the contact element ahead of the car should be approximately 540 feet. And, since the sensor element is leashed on the reelable cable 31, its distance from housing 27 can be varied in accordance with the speed of the rail vehicle. For example, such distance would be set at 310 feet for travel of the vehicle at 30 mph, whereas that distance would be set at 145 feet for 20 mph of vehicle travel.

In accordance with one embodiment of the invention, sensor element 29 is maintained spaced forwardly of housing 27 in the direction of vehicle travel by means of a pneumatic arrangement whereby air under pressure is fed into guide member 25 from an air pressure source (not shown) through a nozzle 34 provided as part of the housing.

Guide member 25 is in a form of a hollow tube having an opening 35 extending therealong covered by a pair of cooperating resilient flaps 36. These flaps normally maintain opening 35 closed through their own resiliency as shown in FIG. 4 even while the sensor element is moving along the guide tube as in the position shown in FIG. 3. As also seen in this FIGURE, the sensor element may be provided with extensions 37 which project into the flaps for preventing rotation of the sensor element about its central axis during the travel thereof.

A stem portion 38 of the nozzle extends between the flaps so as to permit its nozzle 34 to extend wholly within the tube as in the manner shown in FIG. 5. Therefore, these flaps are expanded into an open position equal only to the dimension of stem 38 in the direction of vehicle travel so that, during travel of the rail vehicle, the flaps are only extended openly for a short distance. The tube therefore remains closed between housing 27 and sensor element 29 so as to maintain cable 31 taut during vehicle travel.

Reel 32 is operatively connected to the vehicle speed control (shown in block diagram in FIG. 2) in any desired manner so that the length of cable between housing and the sensor element can be varied in accordance with vehicle speed as, for example, 540 feet for 40 mph travel. Therefore, as vehicle speed accelerates reel 32 continuously unreels its cable until a predetermined vehicle speed is reached whereupon reel 32 may be latched against further rotation. Then, upon detecting a rail obstruction as, for example, a damaged track section which likewise causes tube 25 to become warped or otherwise damaged, further travel of the sensor element is retarded thereby causing its tensioned cable 31 to slacken. The latching arrangement (not shown) for the reel thereupon causes the reel to wind up the cable and to decelerate vehicle speed through its connection with the vehicle speed control. The connection between reel 32 and the vehicle speed control may be founded upon the well-known screw jack principle wherein rotary movement of a threaded reel axle is converted into translatory movement of a standard control lever of the vehicle as the threaded reel axle is threadedly engaged with such lever. The vehicle may therefore be brought to a comfortable stop in advance of the damaged track section as this condition is continuously transmitted automatically to the vehicle speed control while the reel is winding up the cable. Also, the sensor element is capable of detecting the presence of another vehicle on the rail to thereby cause the speed control of vehicle 21 to decelerate in a like manner as described when detecting a damaged rail section. For example, this other vehicle may be provided with an element extending into tube 25 through flaps 36 so that, as the sensor 29 contacts such element, cable 31 slackens and reel 32 commences its winding up operation to decelerate the vehicle until the cable is returned to its taut condition. Such a condition will, of course, be reached as soon as the vehicle ahead of car 21 continues its travel beyond the safe stopping distance devised by the sensor assembly of the invention. Additionally, a station stop signal can be detected by sensor 29 by simply providing such a stop element for extension into and out of hollow tube, when the stop element extends between flaps 36, sensor 29 is capable of detecting same so as to cause the vehicle on which it is attached to decelerate for slowing down or come to a complete stop if necessary.

FIGS. 6 to 8 illustrate three proposed modifications for the hollow tube 25 of FIGS. 3 to 5. For example, tube 25' in FIG. 6 is provided with a single elastomeric flap 39 which may be bonded along one edge 41 of opening 35' provided for this tube. The opposite end of the flap may simply be biased against the inner surface of the tube adjacent edge 42 of its opening.

Tube 25'' shown in FIG. 7 is likewise provided with an opening 35'' provided therealong covered by a pair of cooperating elongated elastomeric seals 43 and 44. Seal 43 may be bonded along edge 45 of the tube opening so as to snugly embrace this edge, while seal 44 may be bonded along edge 46 of the tube opening with a spring member 47 rendering this seal resilient so as to permit stem 38 to be extended through the slit defined between the two seals.

A tube 25''' of plastic or other elastomeric material is shown in FIG. 8 as having a slit 48 provided therealong which is maintained closed by means of spaced spring clamps 49 provided along the length of this tube. Arms 51 of the clamps embrace the sides of tube 25''' and are biased inwardly toward another. In addition, a coil spring 52 may be provided for further urging arms 51 together.

In the embodiments according to FIGS. 6 and 7, the tube openings are covered by resilient means through which the air nozzle is capable of extending for delivering pressurized air into the tube as in the manner described with reference to FIG. 5. In the FIG. 8 embodimemt, tube 25''' may be of a plastic or other elastomeric material so that the air nozzle may be conveniently extended through continuous slit 48 which is otherwise closed throughout its length by means of spring clamps 49.

In accordance with another embodiment of the invention, shown in FIG. 9a sensor element 53 is in the form of a small electrical motor designed for movement along a guide member 54 which may be generally rectangular in cross-section. The electric motor is powered through metal cable 31 from an electric power source (not shown) for the purpose of driving wheels 55 which engage the inner surfaces of guide member 54. Accordingly, the air nozzle and its air source are eliminated and sensor element 53 functions in the exact same manner as sensor element 29 described for the first embodiment. Hence, upon detecting a damaged rail section or another vehicle on the rail or a signal stop, the tension of cable 31 will become slackened as the forward travel of sensor 53 becomes retarded to thereby transmit such a condition to the reel which begins rewinding the cable. The rewind operation of the reel then affects the vehicle speed control to cause speed of the vehicle to decelerate to a complete stop if necessary.

As an alternative to the FIG. 9 embodiment for this electric version of the sensor assembly, an electric motor-driven sensor element 53' is disposed for travel within guide member 54' as shown in FIG. 10. A single drive wheel 56 is mounted on sensor 53' for rotation in engagement with one inner wall of the guide member as the motor is powered through cable 31 as described for the FIG. 9 arrangement. Similarly, an electrically driven sensor element 53'' may be disposed within guide member 54'' as shown in FIG. 11 for driving a pair of spaced wheels 57 along one inner wall thereof. And, in each of the FIGS. 9 to 11 embodiments, drain holes 58 may be provided for the venting of rain water or moisture condensation from guide members 54.

From the foregoing it can be seen that a simple and economical yet highly effective means for sensing a rail obstruction has been provided for automatically transmitting the detection of such obstruction to the vehicle speed control for decelerating the vehicle to a complete stop if necessary so as to avoid a perilous condition. The sensor element is extended into its guide member a distance ahead of the moving vehicle which is sufficient to permit a stopping of the vehicle within a safe distance to avoid an obstruction detected by the sensor. If a portion of the track becomes damaged whereupon the guide member is accordingly squashed or broken, travel of the sensor will become retarded and the reel will commence rewinding of the cable in a manner forming no part of this invention. Such a rewinding operation is designed to affect the vehicle speed control to cause the vehicle to decelerate to a complete stop to thereby avoid a perilous condition which could cause a derailment. Similarly, the presence of another vehicle on the track at a location less than a safe stopping distance required for vehicle 21 travelling at a particular speed, is detected by the sensor thereby causing the rail to rewind the cable and decelerate the vehicle until the other vehicle on the rail moves out beyond the safe stopping distance of vehicle 21. And, a station stop signal element protruding into the guide member is easily detected by the sensor to accordingly cause the vehicle to decelerate to a complete stop when necessary.

The sensor assembly according to the invention could likewise be provided on the last car of a train of rail vehicles so that the sensor elements would be pneumatically or electrically spaced a predetermined distance aft of that last vehicle. Accordingly, upon contact between the sensor elements of a forward and an aft vehicle the reel of the forward sensor assembly may be designed for accelerating that vehicle as it begins reeling up its cable so as to permit that forward vehicle to maintain the required safe stopping distance between the two cars. Alternatively, the aft vehicle may be designed to decelerate upon contact between the two sensor elements similarly as in the manner aforedescribed.

The sensor assembly in accordance with the invention is also fail-safe in that if the leash breaks the car is brought to a controlled stop as the reel rewinds. Double springs or return power units may be used for the reel rewind, and the function of each of these may be monitored by safety lights at a central control station.

Obviously, many other modifications and variations of the present invention are possible in the light of the above teachings. It is therefore to be understood that within the scope of the appended claims the invention may be practiced otherwise than as specifically described.

What is claimed is:

1. In a rail transportation system including a vehicle adapted for travel along a track comprising at least one elongated rail, said vehicle having a speed control mechanism for controlling the speed thereof, a sensing assembly for detecting an obstruction on the rail which would inhibit continued and uninterrupted travel of the vehicle, said assembly including a housing mountable on the vehicle, a contact sensor element movable along and parallel to the rail, an elongated flexible cable interconnecting said housing and said sensor element for maintaining said sensor element at a predetermined distance from said housing depending on the speed of the vehicle, reel means rotatably mounted on said housing on which said cable is reeled for varying the length thereof, said reel means being capable of rewinding said cable upon its being slackened, means for propelling said sensor element along the rail for tensioning said cable at said predetermined distance, and said reel means being operatively connected to the speed control mechanism of the vehicle for decelerating vehicle speed to a complete stop if necessary as said cable becomes slackened upon the retardation of the travel thereof as it contacts a rail obstruction.

2. In the rail transportation system according to claim 1, wherein said sensor element is movable within an elongated guide member mountable on the track parallel to the rail, said means for propelling said sensor element within said guide member comprising a pneumatic device for producing air under pressure against said sensor element, and said guide member comprising a hollow closed tube having a resiliently closable opening therealong, said pneumatic device including a nozzle which extends through said opening during travel of the vehicle.

3. In the rail transportation system according to claim 2, wherein said tube has an elongated slot therealong covered by a pair of cooperating elastomeric flaps defining said closable opening.

4. In the rail transportation system according to claim 2, wherein said tube has an elongated slot therealong covered by a single elastomeric flap secured along one side edge thereof to said tube and movable relative to said tube along an opposite side edge thereof to thereby define said closable opening.

5. In the transportation system according to claim 2, wherein said tube has an elongated slot therealong covered by a pair of cooperating elastomeric seals secured along the edges of said slot, and defining said closable opening, one of said seals being resiliently movable relative to the other of said seals so as to facilitate nozzle extension into said tube.

6. In the transportation system according to claim 2, wherein said tube is of elastomeric material and has a slit therealong defining said opening which is rendered resilient by means of a spring clamp surrounding said tube.

7. In the transportation system according to claim 1, wherein said sensor element is movable within an elongated guide member mountable on the track parallel to the rail, said means for propelling said sensor element within said guide member comprising an electric motor having rotatable wheel means thereon to permit said motor to roll along said guide member, said cable being connectable with an electric power source for powering said motor.

* * * * *